United States Patent [19]
Bierkarre et al.

[11] 4,437,533
[45] Mar. 20, 1984

[54] SYSTEM FOR MONITORING THE COURSE AND FOR CONTROLLING THE BRAKING OF A FREELY MOVABLE VEHICLE, PARTICULARLY AN INDUCTIVELY STEERED VEHICLE, AND VEHICLE WITH SUCH A SYSTEM

[75] Inventors: Hartwig Bierkarre, Hamburg; Gottfried Klinger, Bad Bramstedt; Jürgen Radeloff, Norderstedt; Bernd-Hendrik Rust, Kayhude, all of Fed. Rep. of Germany

[73] Assignee: Firma Jungheinrich Unternehmensuerwaltung KG, Hamburg, Fed. Rep. of Germany

[21] Appl. No.: 338,904

[22] Filed: Jan. 12, 1982

[30] Foreign Application Priority Data

Mar. 18, 1981 [DE] Fed. Rep. of Germany ....... 3110499

[51] Int. Cl.³ .............................................. B62D 1/24
[52] U.S. Cl. ..................................... 180/168; 318/587
[58] Field of Search ........................ 180/168; 318/587; 364/450

[56] References Cited

U.S. PATENT DOCUMENTS

| | | | |
|---|---|---|---|
| 4,083,422 | 4/1978 | Blakeslee | 180/168 |
| 4,307,329 | 12/1981 | Taylor | 180/168 |
| 4,310,789 | 1/1982 | Mank | 180/168 |
| 4,322,670 | 3/1982 | Taylor | 318/587 |

*Primary Examiner*—David M. Mitchell
*Assistant Examiner*—Joseph McCarthy
*Attorney, Agent, or Firm*—Toren, McGeady and Stanger

[57] ABSTRACT

A system for monitoring the course and braking means of a vehicle are provided, which is freely movable and particularly inductively steered. The vehicles comprise drive means and at least one steerable driven wheel, braking means, and a sensor for scanning a guideline. The system comprises an arrangement (25, 27), in which an emergency braking operation for stopping the vehicle within an emergency stopping distance is generated in dependence on a signal which corresponds to the angle between the longitudinal axis of the vehicle and the guideline, and another signal, which corresponds to the lateral departure of the longitudinal center line of the vehicle adjacent to the sensor from the guideline. The emergency stopping distance is shorter than the distance which the vehicle would travel to collide with an obstacle. Limiting values for a maximum or changing steering angle, the contour of the vehicle, the speed of travel and the braking distance under maximum load. The arrangement with its input and output terminals constitutes a self-contained module. A vehicle comprising such an arrangement is also provided.

22 Claims, 13 Drawing Figures

SYSTEM FOR MONITORING THE COURSE AND FOR CONTROLLING THE BRAKING OF A FREELY MOVABLE VEHICLE, PARTICULARLY AN INDUCTIVELY STEERED VEHICLE, AND VEHICLE WITH SUCH A SYSTEM

SUMMARY OF THE INVENTION

This invention relates to a system for monitoring the course and for controlling the braking of a freely movable vehicle, particularly an inductively steered vehicle, which comprises drive means and at least one steerable driven wheel, which is adjustable to a steering angle, braking means, a sensor which serves to scan a guideline and has two output terminals and delivers at one of said output terminals a first signal, which represents the angular misalignment of the longitudinal center line of the vehicle with respect to the guideline, and delivers at another of said output terminals a second signal, which represents the lateral departure of the longitudinal center line of the vehicle adjacent to the sensor from the guideline, which signals may be used to adjust the steering angle of the driven wheel.

The invention relates also to a vehicle comprising a system for monitoring the course of the vehicle on a guide line, comprising a sensor for delivering a signal which represents the angular misalignment of the vehicle with respect to the guideline and a signal which represents the lateral departure of a predetermined point of the longitudinal center line of the vehicle from the guideline.

Such monitoring systems for controlling the travel of a vehicle and vehicle adapted to be controlled by such systems are known per se.

In this context, the vehicles consist particularly of driverless rack-feeding trucks, which travel in passages between shelves and may consist of trucks for feeding high shelves or vehicles for automatic operation.

In connection with such vehicles, which are freely movable on a guideline, it is known to provide a monitoring system which will reduce the speed of the vehicle or effect an emergency stop braking when the vehicle is excessively spaced from the guideline. In that connection it is known to allow for a maximum lateral departure of a predetermined point of the longitudinal center line of the vehicle from the guideline or a maximum misalignment of the vehicle with respect to the guideline. Hereinafter, the lateral departure will be designated Y and the misalignment will be designated $\psi$.

The known monitoring means for controlling the speed of travel and for effecting an emergency stop braking are inadequate because a collision with adjacent shelves cannot be reliably avoided when the vehicle is travelling in narrow passages between shelves. But such known monitoring means are intended to be covered by the present invention.

It is an object of the invention to provide a system which is of the kind described first hereinbefore and serves to monitor the course of a vehicle and ensures that a vehicle travelling in a narrow path, particularly in a passage between shelves, will be prevented from colliding with structures which confine such path of travel, such as shelves, without a need for additional mechanical means.

In this connection it is to be borne in mind that it has been known to provide lateral guide rails in passages between shelves and to provide the vehicles with guide rollers, which are rotatable on vertical axes and engage the guide rails. In such arrangements, mechanical means are provided, which preclude an automatic steering, and additional mechanical means are required at the shelves confining the passages or at the vehicle. It is an object of the invention to avoid such an expenditure and to ensure that in case of a departure of the vehicle from the guideline a braking will be effected so soon that a collision with a structure which defines the path of travel will be avoided.

It is a more specific object of the invention to provide such a circuit arrangement for actuating the braking means of the vehicle in case of an impending collision so that the stopping distance is less than the distance to be traveled by the vehicle to an obstacle with which the vehicle could collide.

In connection with the concept of a guideline, the invention covers also a steering control, particularly an inductive steering control, by means of a guidewire which has been installed in the ground. Particularly in connection with such a non-contacting steering control there is a risk that the vehicle may depart from its course owing to a defect and that an irregularity in the surface on which the vehicle is travelling, such as a hole, will cause an impact to be applied to the vehicle so that it departs from its course. In view of this aspect, a striking of the vehicle, e.g., against a lateral shelf, will result in disadvantages not only because the shelf may be damaged or even destroyed but also because the vehicle may suffer damage.

In this connection the object of the invention is seen in the restricting requirement that such collisions should be avoided also in narrow passages.

It is a more specific object of the invention to provide such a circuit arrangement for actuating the braking means of the vehicle in case of an impending collision so that the stopping distance is less than the distance to be traveled by the vehicle to an obstacle with which the vehicle could collide.

This object is accomplished in accordance with the invention in that the system has at least two input terminals and one output terminal, one of said input terminals receives the signal which represents the angular misalignment $\psi$ and the other input terminal receives the signal which represents the lateral departure, the output terminal is adapted to be connected to the braking means of the vehicle and is adapted to cause said braking means to be applied, and both signal input terminals are associated with at least two input terminals of a processor, which is adapted to compute a maximum permissible lateral departure of a predetermined point of the center line of the vehicle from the guideline in dependence on a steering angle $\theta$, particularly on a maximum steering angle, on the actual lateral departure, and on vehicle parameters, such as the contour of the vehicle, the speed of travel and the maximum emergency braking distance, which circuit arrangement is adapted to deliver to the braking means of the vehicle an emergency braking signal when said maximum permissible lateral departure exceeds the actual lateral departure by less than a predetermined reference value. Such system ensures that the vehicle will be brought to a standstill in case of an unintended large departure from the desired course.

The use of a processor affords the advantage that various significant parameters, which have been mentioned, can be taken into account. In another embodiment of the invention it is important to connect various combining circuits to adding circuits which are adapted to be fed at the same time with signals which depend on the signal applied to the other input terminal and on an adjustable parameter, and on limiting values, particularly for the lateral departure, and the adding circuits are connected by means of respective comparators to a relay circuit or a gate, which has an output terminal connected to the braking means. In that embodiment it is important to define at least one maximum steering angle ($\pm\theta$max) as a basis for evaluating the influences of an angular misalignment of the longitudinal axis and of a lateral departure. This constitutes a special aspect of the invention because it opens up the possibility of generating signals which depend on the position of the vehicle to the guideline and can be utilized for an emergency braking under the aspects which will be stated hereinafter. In accordance with the above, an emergency braking may be initiated when one of the parameters reaches its limiting value. Within the scope of the invention such emergency braking can also be initiated when the normal steering control mechanism has failed and the vehicle has travelled to one boundary of the path of travel.

In a preferred embodiment, a third signal input terminal is provided, which delivers a signal representing the steering angle and which is preferably connected to the adding circuit. In such an arrangement the limiting values for the generation of a signal for initiating an emergency braking may be varied. This will be particularly desirable if an optimum steering control is desired in passages, particularly narrow passages, between shelves.

Switching means consisting of linear operational amplifiers are suitably adjustable to a fixed value. In a desirable embodiment, an electronic comparator is provided, which receives a reference voltage at each of its input terminals. It will be of special advantage, however, to connect the two input terminals for the signals representing the angular misalignment and the lateral departure to four branch circuits, which include respective adding circuits, and to connect adjustable comparators, to which an adjustable reference signal is applied, between the adding circuits and the OR gate. The resulting circuit arrangement can be installed in a small space as a separate compact control module and need not inherently be provided in a steering control system of a vehicle but may be subsequently installed.

Within the scope of the invention the module may include a sensor which has two transducer arrays spaced apart along the vehicle and which in dependence on the distance between the transducer arrays and the measured actual lateral departure produces a signal that represents the angular misalignment and in dependence on the lateral departure measured at one transducer array delivers a signal representing the lateral departure.

In general, the invention contemplates the generation of an emergency braking signal in dependence on the angular misalignment of the vehicle relative to a guideline, on the lateral departure of a predetermined point of the longitudinal center line of the vehicle from the guideline, on a parameter related to the contour of the vehicle and on a parameter related to the maximum emergency braking distance of the vehicle. Reference parameters used are a maximum steering angle of the driven wheel and a maximum speed of the vehicle under maximum load. This results in a teaching for the design of a system in view of essential aspects. For that purpose, characteristic curves used for automatic control may be ascertained with the aid of a computer program or may be empirically ascertained in that a given vehicle having a predetermined contour is driven at different steering angles under its maximum load and at its maximum speed, limiting values depending on the width of an existing passage between shelves are used, and the braking means are applied to determine the braking distance. The values thus obtained can be represented by a family of characteristic curves from which the variables can be derived which are represented by the signals delivered to the components of the circuit arrangement for monitoring the course of the vehicle.

If the sensor is disposed at one end of the vehicle, the control function for the emergency braking can be derived in this manner from straight characteristic curves. Positive and negative values of the maximum angular misalignment and the maximum lateral departure may coincide. The monitoring system has four quadrants for one set of characteristic curves, which combine values for a lateral departure, plotted, e.g., along an ordinate Y, and an angular misalignment $\psi$. If the sensor is disposed at the forward end of the vehicle, an advantageous and particularly simple embodiment of the invention uses approximately straight characteristic curves having the configuration of a rhombus in an Y-$\psi$-system of coordinates. Such rhombus has substantially straight boundary lines, which represent limiting values for an emergency braking and the position of which depends on the steering angle $\theta_1$.

In such an embodiment it is within the scope of the invention to vary the limiting values in dependence on the steering angle $\theta$. This is of considerable importance in narrow passages. Particularly the values for a lateral departure can be changed in that they are increased in the direction which is opposite to the direction of a potential collison as the steering angle increases and are substantially decreased in the direction of a potential collision at a maximum steering angle. This constitutes a special embodiment. The maximum steering angle can be electrically adjusted, for instance, in that the maximum steering angle is mechanically defined by stops, which are adjustable by positioning motors.

Whereas characteristic curves having the configuration of a rhombus may be obtained if the sensor is disposed at the forward end of the vehicle, entirely different curves will be obtained if the sensor is disposed at a different location in the vehicle.

The system is particularly characterized in that the signals are distributed from the two input terminals to a plurality of branch circuits and in that a signal-processing device consisting preferably of a linear operational amplifier is connected to at least one input terminal, both inputs are combined in an adding circuit, to which a voltage is also applied that is proportional to the maximum of one of the limiting values, said adding circuit is succeeded by said comparator, to which a reference voltage is applied that is adjustable in dependence on a certain parameter, or which comprises a blocking diode, and which comparator precedes a relay circuit or a gate, e.g., the above-mentioned OR gate, which precedes the braking means of the vehicle.

The invention provides also a vehicle which includes means for monitoring the course of the vehicle on a guideline, comprising a sensor for generating a signal representing the angular misalignment of the vehicle with respect to the guideline and a signal representing the lateral departure a predetermined point of the longitudinal axis of the vehicle from the guideline, in which vehicle the means for monitoring the course of the vehicle are connected in the manner described between the sensor and the braking means.

The invention will now be explained with reference to illustrative embodiments shown on the accompanying drawings, in which

BRIEF DESCRIPTION OF THE INVENTION

FIG. 1 is a top plan view showing a vehicle in relation to a guideline.

FIG. 2 shows a pattern of characteristic curves for a vehicle equipped in accordance with FIG. 1, FIG. 3 shows diagrammatically a vehicle equipped in accordance with FIG. 1 with additional parts, FIG. 4 shows a circuit arrangement of means for monitoring the course of a vehicle in conjunction with braking means, FIG. 5 shows a further development of the means shown in FIG. 4 for a processing of additional variables, FIG. 6 shows a pattern of characteristic curves which are modified from those of FIG. 2 and result from the additional consideration of another variable for an emergency braking operation, FIGS. 7a to f are detailed circuit diagrams of various subassemblies and facilitate the understanding of the invention, particularly as regards the operational amplifiers, adding circuits, signal generators, comparators, and OR gate and a modifying signal generator, and FIG. 8 is a view showing a detail of FIG. 3 with mechanical stops and means for adjusting them

DETAILED DESCRIPTION OF THE INVENTION

Figure 1:
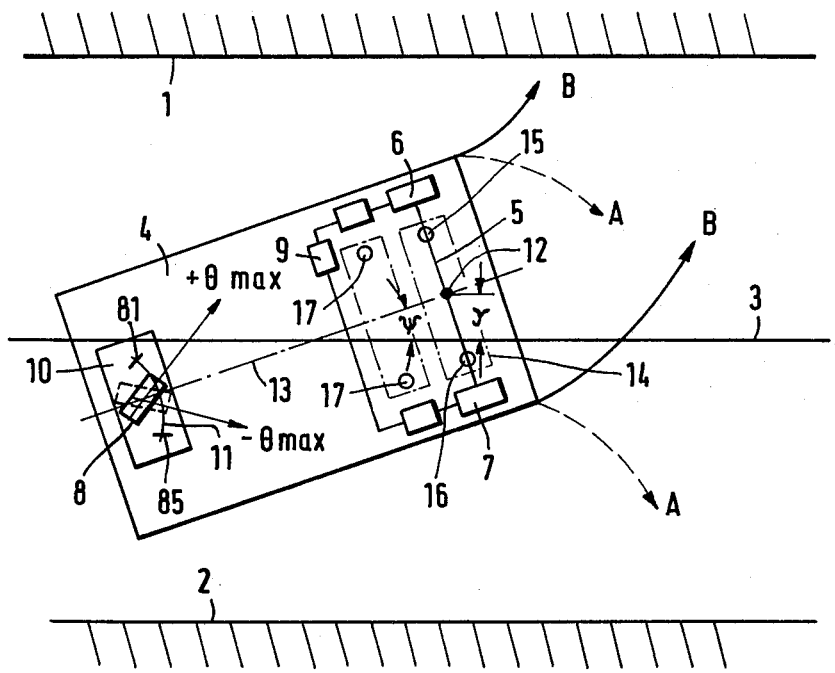

In all figures of the drawings, like parts are designated with like reference characters. For an explanation of the invention it is stated first of all that a guideline wire 3 has been installed centrally between two confining structures 1 and 2, such as shelves, on opposite sides of a passage. That guideline wire can be electrically energized to generate a magnetic field so that a vehicle having a sensor consisting of at least two coils, in a manner known per se, can travel along said guideline 3.

Figure 3:
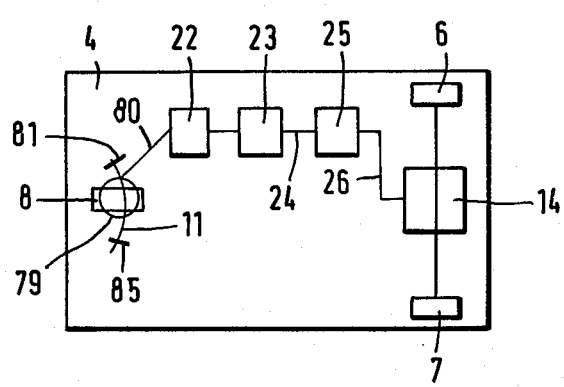

The contour of such vehicle 4 is diagrammatically indicated in FIG. 1. For instance at its forward end, the vehicle has two wheels 6, 7 on a fixed axle 5. At its rear end the vehicle has a steerable driven wheel 8. The steerable driven wheel 8 is operatively connected to a drive motor 22 (FIG. 3).

Figure 7:
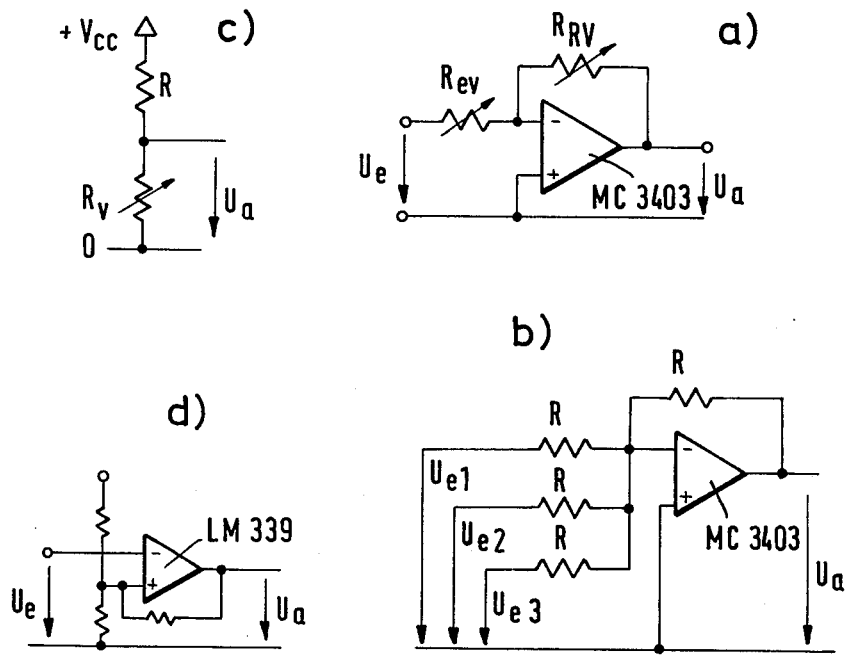
Figure 8:
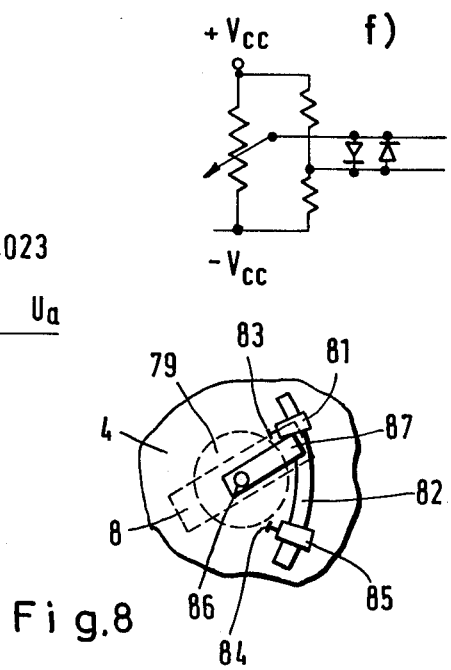

Such vehicle may be provided with a lifting frame, a driver's seat and the like means, which are not shown. Specifically it has braking means 9 and a steering mechanism 10 for steering the steerable driven wheel 8. The steering mechanism 10 is provided with limiting means defining a maximum steering angle. Said limiting means are diagrammatically represented in FIG. 1 by an arcuate line 11 and will be described more in detail with reference to FIG. 8. Within the scope of the invention, a modifying signal generator as shown in FIG. 7 may be used or mechanical limiting means as shown in FIG. 8.

In the embodiment shown in FIG. 1, a sensor 14 extends along the axle 5 and is symmetrical to the center 12 of said axle, which center lies on the longitudinal center line 13 of the vehicle. The sensor includes two transducers 15, 16, which are laterally spaced from the longitudinal center line of the vehicle on opposite sides thereof. By means of the transducers, the sensor 14 generates a lateral departure signal Y, which represents the lateral departure of the point 12 on the longitudinal center line of the vehicle from the guideline 3. The sensor 14 is surrounded by a phantom line.

The sensor comprises a second pair of transducers 17, which are spaced apart from the transducers 15, 16 and deliver a corresponding signal, which is processed with the signal generated by the transducers 15, 16 and with the distance between the pair of transducers 15, 16 and the pair of transducers 17 along the longitudinal center line of the vehicle 4 to generate a signal representing the angular misalignment $\psi$ of the longitudinal center line of the vehicle with respect to the guideline 3.

The difference between the two lateral departures is calculated and in conjunction with the distance between the pair of transducers 15, 16 and the pair of transducers 17 in the longitudinal direction of the vehicle can be used to calculate the hypotenuse of a right-angled triangle so that the angular misalignment $\psi$ can be determined by a sine function.

Figure 2:
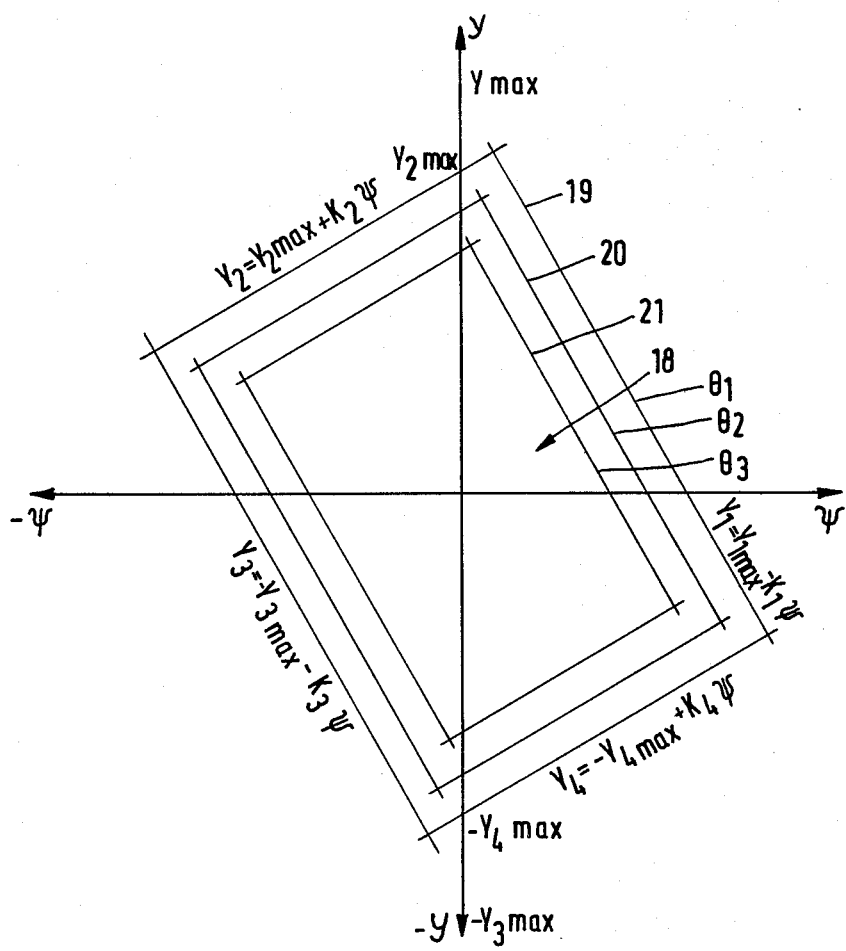

FIG. 1 shows an illustrative embodiment of the invention. The characteristic curves shown in FIGS. 2 and 6 relate to that embodiment. The straight characteristic curves shown in said figures will be obtained with a sensor arranged substantially as shown in FIG. 1. It will be understood that the values for for the angle $\psi$ and the values for the lateral departure Y may have the same sign (positive or negative) or may have different signs in consideration of the absolute values.

If a sensor is disposed approximately at the center of the length of the vehicle arranged as shown in FIG. 1, the lateral departure Y will then be zero whereas the angular misalignment $\psi$ will be the same. In such case the characteristic curves will be different from those shown for the embodiment of FIG. 1. This is emphasized because characteristic curves need not be computed but for a given type of vehicle may be ascertained in dependence on the position of a sensor.

In the embodiment shown in FIG. 1, the lateral departures Y may be plotted as ordinates and the angular misalignments $\psi$ may be plotted as abscissas to provide characteristic curves which define a rhombic 18. Three different patterns 19 to 21 of the characteristic curves are shown. Different maximum lateral departures $Y_{1max}$, $Y_{2max}$, $Y_{3max}$ and $Y_{4max}$ will be associated with selectable different maximum steering angles $\theta_1$, $\theta_2$ and $\theta_3$. It is apparent that the characteristic curves obtained with a sensor arranged at the forward end of a vehicle can be sufficiently approximated by substantially straight characteristic curves; this will simplify the design of the system.

Four equations representing straight lines will be obtained for the arrangement shown in FIG. 1:

$$Y_1 = Y_{1max} - K_1\psi \qquad (1)$$

$$Y_2 = Y_{2max} + K_2\psi \qquad (2)$$

$$Y_3 = -Y_{3max} + K_3\psi \qquad (3)$$

$$Y_4 = -Y_{4max} - K_4\psi \qquad (4)$$

In the example shown, the factors $K_1$ and $K_3$ associated with the parallel straight lines are equal and so are the constants $K_2$ and $K_4$. For this reason only two branches circuits are required in a simple circuit arrangement for that special embodiment. In another embodiment, particularly with a different position of the sensor in the vehicle so that different characteristic curves are obtained, the invention includes also a circuit arrangement having four branches corresponding to the four quadrants of a system of coordinates.

The following equations for a sampling function F are used to initiate an emergency stop braking operations in response to an increase of the lateral departure beyond the four limits thus ascertained.

$$F_1 = Y - (Y_{1max} - K_1\psi) \quad (5)$$

$$F_2 = Y - (Y_{2max} + K_2\psi) \quad (6)$$

$$F_3 = -Y + (-Y_{3max} + K_3\psi) \quad (7)$$

$$F_4 = -Y + (-Y_{4max} - K_4\psi) \quad (8)$$

An associated condition is $F_i \geq 0$, where $i = 1, 2, 3$ or 4. Corresponding circuit arrangements are shown in FIGS. 4 and 5.

These conditions stated for $F_i$ represent the limiting values and constants or changing limiting values which are fed to the circuit for initiating the emergency braking operation.

FIG. 3 is a block circuit diagram showing essential parts of a vehicle as shown in FIG. 1, comprising a steerable driven wheel 8, with which a drive motor 22 and steering means 79 provided with the above-mentioned limiting stops 11 are associated. The vehicle also comprises a sensor 14 and braking means 23, which are associated with the drive motor 22 and are operatively connected by a link 24 to a circuit arrangement 25 for monitoring the course of the vehicle. Said circuit arrangement is connected by a function line 26 to the sensor arrangement 14. The braking means 23 will be operated to effect an emergency braking in response to certain signals delivered by the circuit arrangement 25. The gearing between the steering mechanism 79 and the drive motor 22 is designated 80.

Figure 4:
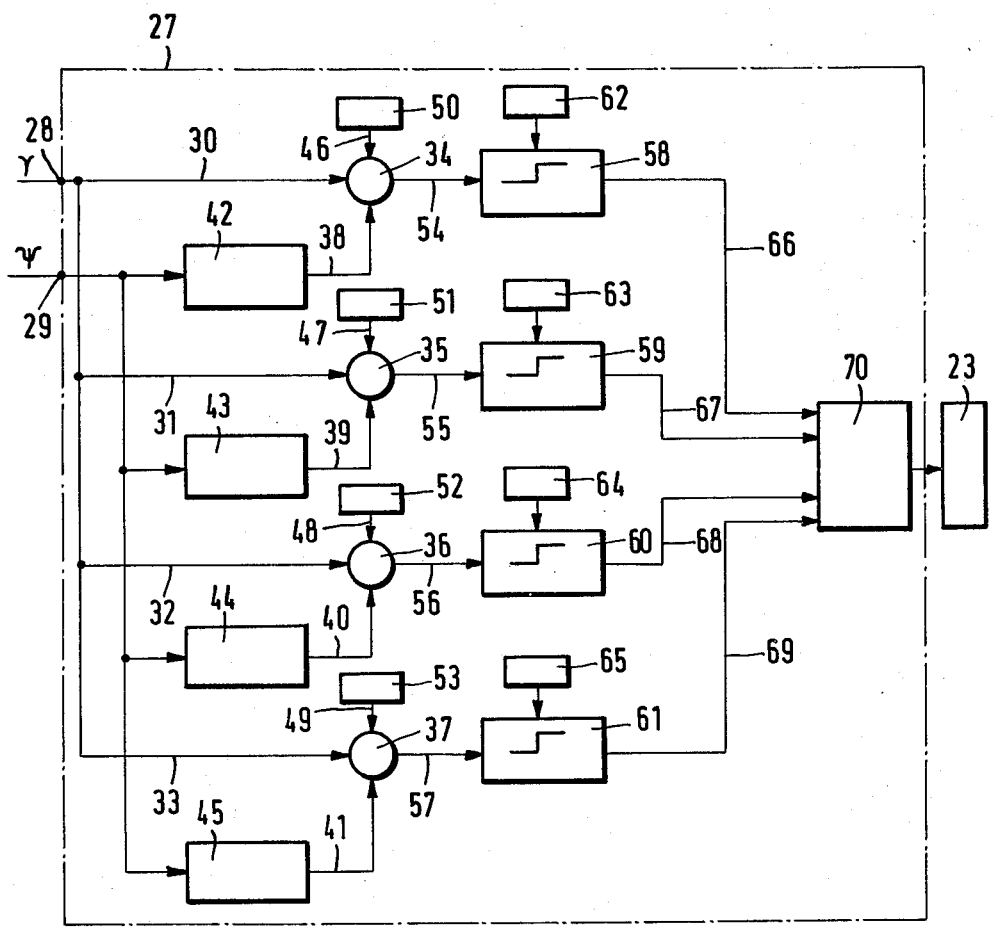
Figure 5:
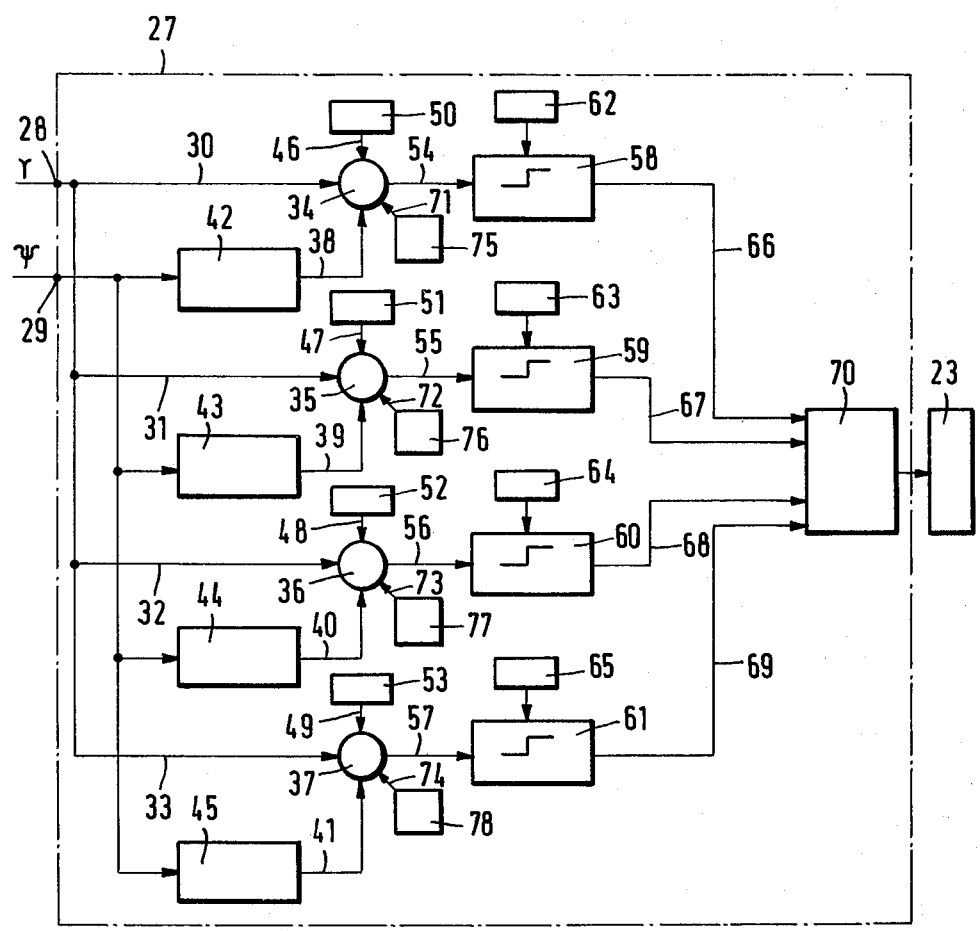

FIG. 4 shows a circuit arrangement 27 for monitoring the course of travel of the vehicle. The circuit arrangement has two input terminals 28, 29 for receiving respective signals representing the lateral departure Y and the angular misalignment $\psi$ of the vehicle. The input terminal 28 is directly connected by leads 30 to 33 to adding circuits 34 to 37, which are also fed at a second input terminal via leads 38 to 41 with output signals of respective linear operational amplifiers 42 to 45, which receive from the other input terminal 29 the signal representing the angular misalignment $\psi$. Each of said linear operational amplifiers 42 to 45 multiplies its input voltage with a constant which has been selected in dependence on parameters of the vehicle, such as the contour, the maximum speed, and the maximum emergency braking distance. In addition to the input terminals connected to the input terminal 28 and to the leads 38 to 41, each of the adding circuits 34 to 37 has a third input terminal 46, 47, 48 or 49, to which a proportional or voltage signal is applied, which represents a maximum lateral departure Y, which is associated with a predetermined maximum steering angle $\theta_{max}$, and constitutes a limiting value in an arrangement as shown in FIG. 4. Signal generators 50 to 53 are connected to the input terminals 46 to 49, respectively, and either generate an adjustable voltage corresponding to said maximum lateral departure or consist of proportional amplifiers which derive such voltage from a general power supply.

Circuits 58 to 61 which consist of electronic comparators are connected at one input terminal to respective output terminals 54 to 57 of the adding circuits 34 to 37. A second input terminal of each of the comparators 58 to 61 receives from a reference voltage generator 62, 63, 64 or 65 a signal representing a reference value associated with the characteristics curves shown in FIG. 2. In case of an impending collision, the comparators 58 to 61 generate or transmit a signal for initiating an emergency braking operation. The comparatos 58 to 61 are connected by function lines 66 to 69 to an OR gate 70, which is connected to braking means 23 as shown in FIG. 3, where the parts 24, 25 represent to the module 27.

In accordance with FIG. 5, each of the adding circuits 34 to 37 has a fourth input terminal 71, 72, 73 or 74, which is connected to a signal generator 75, 76, 77 or 78 for generating a modifying signal in dependence on the changing steering angle $\theta$. As is shown by way of example in FIG. 6, this results in a shifting of the characteristic curves between $+Y$ and $+\psi$ and $-Y$ and $-\psi$ in comparison with FIG. 2 and in view of the arrangement shown in FIG. 1 it is apparent that in case of a travel with a steering angle $+\theta_{max}$ along course A toward the guideline the limiting value will be increased in case of positive Y and $\psi$ values whereas in case of a travel with a steering angle $-\theta_{max}$ along course B toward an obstacle the limiting value will be decreased in case of positive Y and $\psi$ values and decreased in case of negative Y and $\psi$ values. This means that the reference value for an emergency stop braking will be increased while the vehicle travels along course A in FIG. 1 but in case of a failure of a steering drive the reference value for an emergency stop braking will be decreased during a travel with a maximum steering angle $-\theta_{max}$.

That change results in the following equations for characteristic curves for small steering angles:

$$Y_1 = Y_{1\theta 1} - K_1\psi + K_{\theta 1}\theta \quad (9)$$

$$Y_2 = Y_{2\theta 2} + K_2\psi + K_{\theta 2}\theta \quad (10)$$

$$Y_3 = Y_{3\theta 2} + K_3\psi + K_{\theta 3}\theta \quad (11)$$

$$Y_4 = Y_{4\theta 2} + -K_4\psi + K_{\theta 4}\theta \quad (12)$$

where $\theta_2 = 0$ for $Y_1$ to $Y_4$. In the embodiment according to FIG. 2, where the characteristic curves are represented by the formulas (1) to (4), the constants $Y_{max}$ and K can be determined from the sides of the rhombi which have been ascertained.

In the circuit arrangement shown in FIG. 4, the operational amplifiers 42 to 45 deliver the outputs $K_1\psi$, $K_2\psi$, $K_3\psi$, and $K_4\psi$, respectively, and the outputs of the adding circuits equal $F_1$, $F_2$, $F_3$ and $F_4$ of equations (5) to (8).

In the circuit arrangement shown in FIG. 4, the operational amplifiers 42 to 45 deliver the same outputs as those in FIG. 4 and the signal generators 75 to 78 deliver respective outputs equal to $-Y_{1max} + Y_{1\theta 2} + K_{\theta 2}\theta$ $-Y_{2max} + Y_{2\theta 2} + K_{\theta 2}\theta$ $-Y_{3max} + Y_{2\theta 2} + K_{\theta 3}\theta$ $-Y_{4max} + Y_{4\theta 2} + K_{\theta 4}\theta$ In all Figures, the symbol R designates a resistor and the suffix v, e.g., in FIG. 7c, indicates that the resistor is variable.

FIG. 7a is a detailed circuit diagram illustrating one of the operational amplifiers 42 to 45. It is apparent that resistors are connected to the input so that the function $U_a = (R_{R\theta}/R_{e\theta})U_e$. A suitable operational amplifier is available as Component MC 3403 from Motorola. The desired constant will be obtained by the selection of suitable resistances for the input resistor $R_3$ and the feedback resistor $R_{R\theta}$.

The supply voltage is designated $V_{cc}$ and the associated voltage lead O is at the ground potential. Suffix a indicates an output and suffix e an input so that $U_a$ designates an output voltage and $U_e$ an input voltage.

FIG. 7b illustrates a circuit detail of the adding circuits 34 to 37 and the input connections thereof. In that case the function $U_a = U_{e1} + U_{e2} + U_{e3}$ is obtained.

FIG. 7c shows a voltage divider circuit to illustrate the signal generators 50 to 53 and 75 to 78 and the reference voltage sources 62 to 65.

FIG. 7d shows an example of an electronic comparator as is indicated at 58 to 61. Such comparators are commercially available as operational amplifiers of Type LM 339 from National Semiconductor. The input resistors shown are connected to the supply voltage so that the corresponding potential is applied to one input terminal.

FIG. 7e illustrates the OR gate 70. The input voltages $U_{e1} \ldots U_{e4}$ are applied to an respective components which are available as Type MC 4069 from Motorola and the outputs of which are connected to a component which is available as Type MC 4023. Component MC 4069 shown in FIG. 7a is an operational amplifier succeeded by an inverter, as is indicated by the symbol.

This OR gate performs the function $$U_a = U_{e1} \vee U_{e2} \vee U_{e3} \vee U_{e4}$$

$$Ua = \overline{\overline{U_{e1}} \quad \overline{U_{e2}} \quad \overline{U_{e3}} \quad \overline{U_{e4}}}$$

Figure 6:
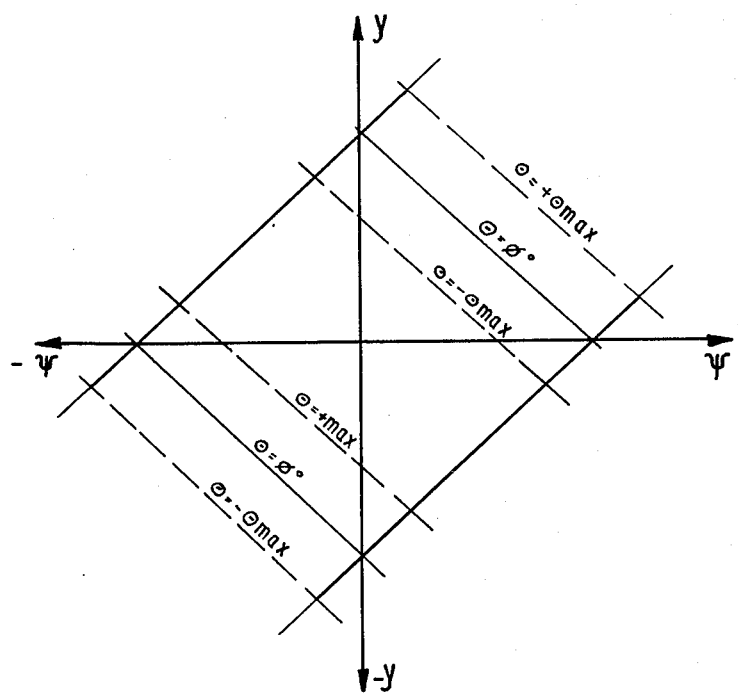

FIG. 7f shows an example of a signal generator for electrically changing the maximum steering angle $\theta_{max}$ as has been explained with reference to FIG. 6.

FIG. 7f illustrates only an example. The circuit consisting of resistors, one of which is variable, is connected to the supply voltage leads $+V_{cc}$ and $-V_{cc}$. On the output side, two Zener diodes are connected, the bases of which are connected to the supply voltage leads $+V_{cc}$ and $-V_{cc}$ by the voltage divider consisting of two fixed resistors. In this way the base voltage of the Zener diodes is determined. The steering circuit is not shown in detail. FIG. 7f shows only by wax of example how the circuit can be electrically adapted to a selected maximum steering angle, which is controlled by the steering mechanism 79 in conjunction with a swivel pin mounting, as shown in FIGS. 3 and 8.

FIGS. 1 and 3 show the steerable driven wheel with the arcuate track 11, on which stops 81, 85 are mounted.

In the detailed view of FIG. 8, the arcuate track is shown to comprise a suitable curved rail 82, which is carried by the vehicle 4. In one embodiment, the stops 81, 85 are fixedly mounted on said rail. If an adjustment of the maximum steering angle is desired, the stops 81, 85 are slidably mounted on the rail 82 and may be fixed in adjusted positions corresponding to a desired maximum steering angle. For this purpose, fixing screws 83, 84 extending at right angles to the rail 82 are screwed into the latter and into tapped holes of the stops 80, 81. As the inner end of each of said screws bears on the rail 82, the stops are fixed. The rail 82 may be provided with cup-shaped recesses for receiving the head of each fixing screw. With such an arrangement, the maximum steering angle can be selected for a travel in specific directions with reference to a family of characteristic curves.

The driven wheel 8 and the steering mechanism 79 are also shown in FIG. 8. The vertical swivel pin 86 by which the steering mechanism 79 is mounted carries a stop lever 87, which is non-rotatably connected to the steering drive wheel and is engageable with the stops 81 and 85 to limit the maximum steering angle.

We claim:

1. In a circuit arrangement for initiating an emergency braking operation of a vehicle traveling along a guideline which extends at the center of a path defined by obstacles on at least one side, which vehicle comprises a steerable driven wheel, means defining a maximum steering angle for said driven wheel, travel drive means for driving said driven wheel, braking means arranged to effect an emergency braking of said vehicle within a predetermined maximum emergency stopping distance in response to the delivery of an emergency braking signal to said braking means, and a sensor which has first and second sensor output terminals and is operable to deliver at said first sensor output terminal an angular misalignment signal representing the angle between the longitudinal axis of the vehicle and said guideline and to deliver at said second sensor output terminal an actual departure signal representing the actual lateral departure of a predetermined point of the longitudinal center line of the vehicle from said guideline, the improvement residing in that said circuit arrangement comprises a processor having a first input terminal adapted to be connected to said first sensor output terminal, a second input terminal adapted to be connected to said second sensor output terminal, a third input terminal, and a constant-defining circuit defining a constant which depends on the contour of said vehicle in plan view and on said maximum emergency stopping distance, a maximum departure signal generator connected to said third input terminal and operable to deliver to said third input terminal a maximum departure signal representing a maximum lateral departure of a predetermined point on said longitudinal center line from said guideline in dependence on said maximum steering angle and the width of said path of travel said processor being operable to compute a maximum permissible lateral departure of said predetermined point of said longitudinal center line from said guideline in dependence on said actual lateral departure signal, said maximum departure signal, said angular misalignment signal, and said constant, and to deliver to said braking means said emergency signal when said maximum permissible lateral departure exceeds said actual lateral departure by less than a predetermined value.

2. The improvement set forth in claim 1, as applied to circuit arrangement for initiating an emergency braking operation of a vehicle which comprises a steering mechanism for steering said driven wheel in dependence on said angular misalignment signal and said actual lateral departure signal.

3. The improvement set forth in claim 1, wherein
said processor comprises a processing circuit which is connected to said first processor input terminal and includes said constant-defining circuit and is operable to process said angular misalignment signal in dependence on said constant and said processor is operable to compute said maximum permissible lateral departure in dependence on the output of said processing circuit.

4. The improvement set forth in claim 1, wherein said processor comprises an adding circuit which on its input side is connected to said second and third processor input terminals and said processing circuit and operable to generate a voltage signal representing the difference between said maximum permissible lateral departure and said actual lateral departure, and a comparator for comparing said difference signal with a predetermined reference voltage and for delivering to said braking means said emergency braking signal when said reference voltage exceeds said voltage signal.

5. The improvement set forth in claim 4, wherein
said processor comprises four of said adding circuits which are connected in parallel to said second processor input terminal, four of said third processor input terminals associated with respective ones of said adding circuits, four of said processing circuits associated with respective ones of said adding circuits, and four of said comparators associated with respective ones of said adding circuits, four of said maximum lateral departure signal generators are provided, which are connected to respective ones of said third processor input terminals, and a combining circuit is provided for delivering said emergency braking signal from said comparators to said braking means.

6. The improvement set forth in claim 5, wherein said combining circuit comprises a relay circuit.

7. The improvement set forth in claim 5, wherein said combining circuit comprises a gate.

8. The improvement set forth in claim 7, wherein said gate comprises an OR gate.

9. The improvement set forth in claim 5, in which an adjustable reference voltage generator is connected to each of said comparators and adapted to apply the adjustable predetermined reference voltage to said comparator.

10. The improvement set forth in claim 4, in which said comparator comprises a limiting diode which defines said predetermined reference voltage and is adapted to deliver to said braking means said emergency braking signal when said reference voltage exceeds said voltage signal.

11. The improvement set forth in claim 3, wherein said processing circuit comprises a linear operational amplifier.

12. The improvement set forth in claim 1, wherein said maximum lateral departure signal generator comprises a memory for storing said maximum steering angle.

13. The improvement set forth in claim 1, wherein said processor has a fourth processor input terminal, an actual steering angle signal generator is connected to said fourth processor input terminal and adapted to deliver to said processor via said fourth processor input terminal an additional signal, which depends on the actual steering angle of said vehicle, and said processor is operable to compute said maximum permissible lateral departure of said predetermined point of said longitudinal center line from said vehicle in dependence on said additional signal.

14. The improvement set forth in claim 1, wherein said constant-defining circuit is adjustable to define an adjustable constant.

15. The improvement set forth in claim 1, wherein said circuit arrangement is comprised in a module which is adapted to be detachably mounted in a vehicle.

16. The improvement set forth in claim 1, as applied to a vehicle wherein said sensor comprises two transducer arrays, which are spaced apart along said vehicle, and is operable to generate said actual lateral departure signal in dependence on the lateral departure of said longitudinal center line at one of said transducer arrays from said guideline and to generate said angular misalignment signal in dependence on the distance between said transducer arrays and the lateral departure of said longitudinal center line at each of said transducer arrays from said guideline.

17. The improvement set forth in claim 1, wherein said maximum lateral departure signal generator is operable to deliver to said third input terminal a maximum departure voltage signal which is proportional to a maximum lateral departure of a predetermined point on said longitudinal center line from said guideline in dependence on said maximum steering angle.

18. In a vehicle travelling along a guideline which extends at the center of a path defined by obstacles on at least one side, which vehicle comprises a steerable driven wheel, means defining a maximum steering angle for said driven wheel, travel drive means for driving said driven wheel, braking means arranged to effect an emergency braking of said vehicle within a predetermined maximum emergency stopping distance in response to the delivery of an emergency braking signal to said braking means, a sensor which has first and second sensor output terminals and is operable to deliver at said first sensor output terminal an angular misalignment signal representing the angle between the longitudinal axis of the vehicle and said guideline and to deliver at said second sensor output terminal an actual departure signal representing the actual lateral departure of a predetermined point of the longitudinal center line of the vehicle from said guideline, and a circuit arrangement for initiating an emergency braking operation of said braking means in dependence on said angular misalignment signal and said actual angular departure signal, the improvement residing in that said circuit arrangement comprises a processor having a first input terminal adapted to be connected to said first sensor output terminal, a second input terminal adapted to be connected to said second sensor output terminal, a third input terminal, and a constant-defining circuit defining a constant which depends on the contour of said vehicle in plan view and on said maximum emergency stopping distance a maximum departure signal generator connected to said third input terminal and operable to deliver to said third input terminal a maximum departure signal representing a maximum lateral departure of a pedetermined point on said longitudinal center line from said guideline in dependence on said maximum steering angle and the width of said path of travel, said processor being operable to compute a maximum permissible lateral departure of said predetermined point of said longitudinal center line from said guideline in dependence on said actual lateral departure signal, said maximum departure signal, said angular misalignment signal and said constant, and connected to said braking means and adapted to deliver to said braking means said emergency braking signal when said maximum permissible lateral departure exceeds said actual lateral departure by less than a predetermined value.

19. The improvement set forth in claim 18, wherein said constant-defining circuit defines a constant depending on maximum speed of travel of said vehicle.

20. The improvement set forth in claim 18, wherein said sensor and said circuit arrangement are incorporated in a module which is detachably mounted on the vehicle.

21. The improvement set forth in claim 18, wherein said vehicle comprises a steering mechanism for steering said driven wheel in dependence on said angular misalignment signal and said actual lateral departure signal.

22. In a module for use in a vehicle travelling along a guideline which extends at the center of a path defined by obstacles on at least one side, which vehicle comprises a steerable driven wheel, means defining a maximum steering angle for said driven wheel, travel drive means for driving said driven wheel, braking means arranged to effect an emergency braking of said vehicle within a predetermined maximum emergency stopping distance in response to the delivery of an emergency braking signal to said braking means, which module comprises a sensor which has first and second sensor output terminals and is operable to deliver at said first sensor output terminal an angular misalignment signal representing the angle between the longitudinal axis of the vehicle and said guideline and to deliver at said second sensor output terminal an actual departure signal representing the actual lateral departure of a predetermined point of the longitudinal center line of the vehicle from said guideline and a circuit arrangement for initiating an emergency braking operation of said braking means in dependence on said angular misalignment signal and said actual angular departure signal, the improvement residing in that said circuit arrangement comprises a processor having a first input terminal adapted to be connected to said first sensor output terminal, a second input terminal adapted to be connected to said second sensor output terminal, a third input terminal, and a constant-defining circuit defining a constant which depends on the contour of said vehicle in plan view and on said maximum emergency stopping distance, a maximum departure signal generator connected to said third input terminal and operable to deliver to said third input terminal a maximum departure signal representing a maximum lateral departure of a predetermined point on said longitudinal center line from said guideline in dependence on said maximum steering angle and the width of said path of travel, said processor being operable to compute a maximum permissible lateral departure of said predetermined point of said longitudinal center line from said guideline in dependence on said actual lateral departure signal, said maximum departure signal, said angular misalignment signal, and said constant, and to deliver to said braking means said emergency braking signal when said maximum permissible lateral departure exceeds said actual lateral departure by less than a predetermined value.

* * * * *